Oct. 26, 1971     B. HENNING     3,614,901
STEERING WHEEL FOR MOTOR VEHICLES
Filed Dec. 16, 1969     2 Sheets-Sheet 1
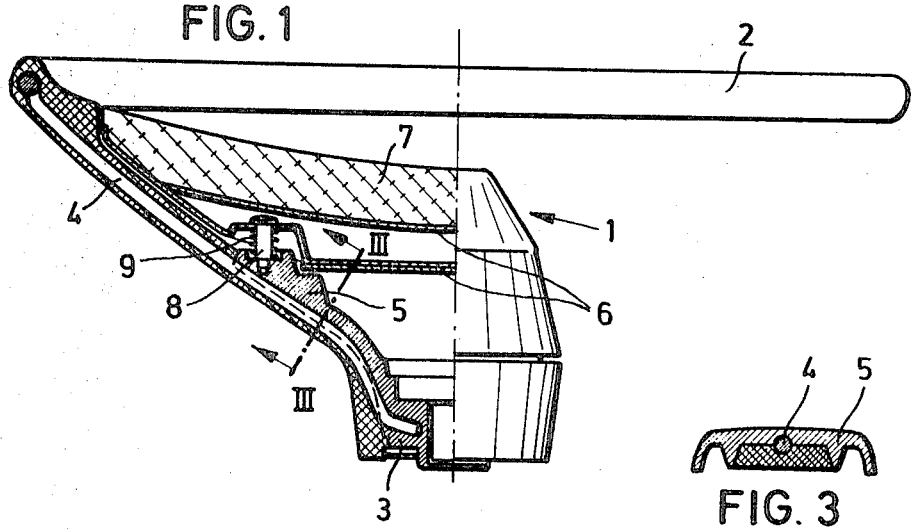
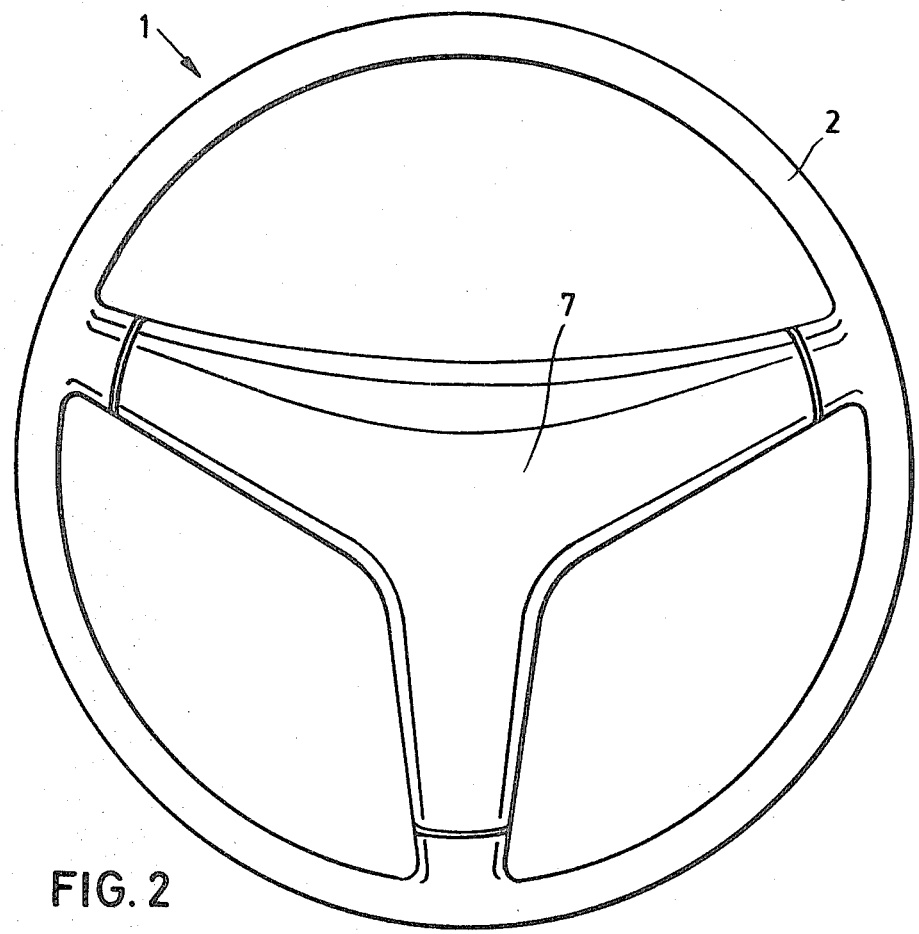
INVENTOR
Bodo Henning
BY
Watson, Cole, Grindle & Watson
Attys.

Oct. 26, 1971   B. HENNING   3,614,901
STEERING WHEEL FOR MOTOR VEHICLES
Filed Dec. 16, 1969   2 Sheets-Sheet 2

INVENTOR
Bodo Henning
BY
Watson Cole Grindle & Watson
Attys.

United States Patent Office 3,614,901
Patented Oct. 26, 1971

3,614,901
STEERING WHEEL FOR MOTOR VEHICLES
Bodo Henning, Braunschweig, Germany, assignor to Volkswagenwerk Aktiengesellschaft, Wolfgang, Germany
Filed Dec. 16, 1969, Ser. No. 885,482
Claims priority, application Germany, Dec. 17, 1968, P 18 15 130.9
Int. Cl. B62d 1/04
U.S. Cl. 74—552      3 Claims

ABSTRACT OF THE DISCLOSURE

A steering wheel for motor vehicles having a rim attached to a hub portion by a plurality of spoke inserts. The hub portion includes an arm extending radially outwardly over each spoke insert. The arms are shorter than the spoke inserts and each arm has an outer end disposed between the rim and the center of the hub. A shock absorber member is mounted on the outer ends of the arms.

---

Figure 4:
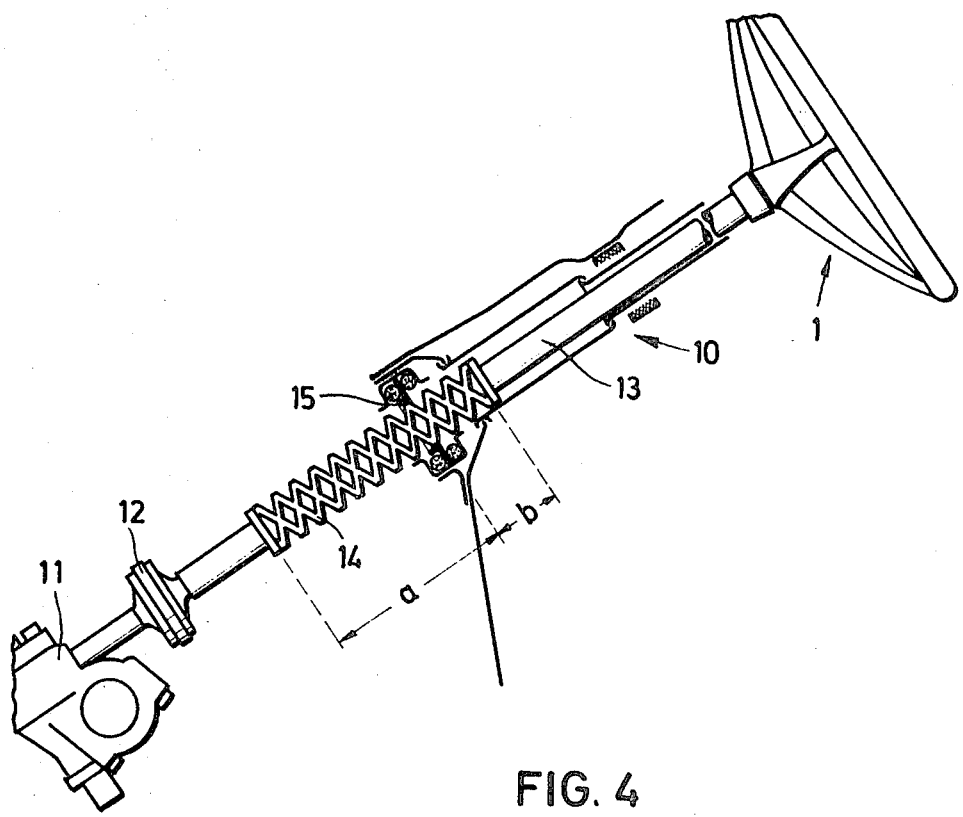

This invention relates to steering wheels for motor vehicles and particularly to steering wheels which include provision for rendering the same less likely to cause injury to an operator during a collision.

Injuries stemming from automobile accidents can be minimized or prevented through the use of steering wheels in which the hub is below the upper rim of the steering wheel. Thus, in an accident, a drive forced against the outer rim of the steering wheel may be supported solely by the rim without contacting the hub. In order to provide a large surface for supporting the body of a driver during impact, it is generally known to include a large-surfaced, padded pressure body within the rim of the wheel,. The rigid rim of the steering wheel provides a further source of danger. Hence, it is desirable to interconnect the peripheral rim of the steering wheel and the hub portion with means which permits bending of the rim relative to the hub. Wheels equipped with such means in the past have not generally provided adequate support against forces which may be applied, for example, when an operator grabs the wheel with one hand during mounting or dismounting a vehicle.

The present invention provides a steering wheel in which the various drawbacks discussed above are avoided at least in part, by providing the steering wheel which is capable of yielding in the direction of travel of the vehicle, and which has increased rigidity relative to forces directed on the steering wheel in other directions.

As a solution of the problems discussed, structure is provided which comprises a hub having projections extending in the direction of the spoke inserts. These projections surround the spokes only on their upper sides (the sides facing the driver). The ends of the projections serve as a rigid support for a large-surfaced padded pressure body provided in a known manner between the hub and the rim of the steering wheel. Through the unilateral supporting of the spoke inserts, the stationary strength of the rim of the steering wheel, in regard to pressure and stress, is variable, since the projections of the hub share in load carrying only in the case of a tension load. The rim of the steering wheel therefore yields under a relatively slight pressure load, so that serious injuries to the head and stomach will be avoided upon impact against the rim of the steering wheel. At the same time, the driver will be absorbed softly by the padded pressure body provided on the steering wheel, which can also be developed effectively as a button for the horn. On the other hand, the rim of the steering wheel is sufficiently solid, having a sufficient stability to twisting, in order to absorb forces which may be applied, for example, by the operator pulling himself from a sitting position.

Further objects of the invention will be apparent from the following description when considered in connection with the accompanying drawings in which:

FIG. 1 is a side view partly in section of a portion of the steering wheel,
FIG. 2 is a top plan view of the steering wheel,
FIG. 3 is a cross-section of an arm of the wheel taken on line III—III of FIG. 1 in the direction of the arrows, and
FIG. 4 is a side view partly in section of the steering wheel and steering column.

The steering wheel 1, has a wheel rim 2 and a hub portion 3 of light metal spaced from one another and interconnected with one another by metal spoke inserts 4. The inserts 4 have an easily disruptable artificial material cast around them, and have their ends anchored in the hub portion 3. An arm 5 is provided for each insert 4. Arms 5 project, from hub 3 and extend approximately to one-half the length of the space insert 4. As can be seen in FIG. 3, arms 5 cover only approximately the upper one-half of inserts 4. The ends of arms 5 serve the purpose of supporting a stable shock absorber body 6 provided with a cushion 7 which have been recessed within the steering wheel 1 together. The shock absorber 6 is mounted on carrying arms 5 for movement axially of the steering column by means of spiral springs 9 disposed around bolts or pins 8. Thus, absorber 6 may work in conjunction with an operator for a signal horn.

It will be apparent from the drawing that the steering wheel rim 2 can withstand a slighter load or force in the direction of the hub 3 than in any other direction, due primarily to the embedding of the unilateral spoke inserts 4 in the supporting arms 5.

The steering wheel 1 is secured to the end of a safety steering column 10. A collapsible or deformable lattice-like tube 14, is provided between steering mechanism 11, and steering shaft section 13. Tube 14 is divided in two sections *a* and *b* by means of a securing flange 15. Section *a* of the tube 14 will be collapsed during an accident when the vehicle strikes an obstacle. Section *b* will be pressed together by the weight or force of the driver against the steering wheel.

I claim:
1. A steering wheel for motor vehicles comprising:
   a hub portion connected to a steering column;
   a generally annular steering rim disposed above said hub portion and coaxial therewith;
   a plurality of elongated, radially extending spoke inserts interconnecting the rim and the hub, each insert having one of its ends anchored in said hub and its opposite end anchored in said rim;
   said hub portion including an outwardly radiating supporting arm for each spoke insert, each arm being disposed on the upper portion of its corresponding insert and being shorter than its insert, each arm having an outer end spaced between the steering column and the rim; and
   a shock absorber body mounted on the outer ends of said arms.

2. A steering wheel as set forth in claim 1 wherein said steering column includes a collapsible element operable to collapse and thereby shorten said column in response to a force applied at either end of the column.

3. A steering wheel as set forth in claim 1 wherein said shock absorber member is mounted on the ends of the arms for movement axially of the column, there being an operator for a signal horn attached to said absorber member.

(References on following page)

References Cited

UNITED STATES PATENTS

| | | | |
|---|---|---|---|
| 2,872,539 | 2/1959 | Berner | 74—552 X |
| 2,913,924 | 11/1959 | Pratt | 74—552 |
| 3,016,764 | 1/1962 | Fredericks et al. | 74—552 |
| 3,055,231 | 9/1962 | Daniel | 74—552 |
| 3,087,352 | 4/1963 | Daniel | 74—552 |
| 3,373,629 | 3/1968 | Wight et al. | 74—492 |
| 3,440,897 | 4/1969 | Dutt et al. | 74—552 |
| 3,500,698 | 3/1970 | Richter | 74—493 |
| 3,523,464 | 8/1970 | Quillery et al. | 74—552 |

WILLIAM F. O'DEA, Primary Examiner

F. D. SHOEMAKER, Assistant Examiner

U.S. Cl. X.R.

74—493